March 17, 1953  H. R. REYNOLDS  2,631,902
JOURNAL BOX
Filed May 24, 1949  2 SHEETS—SHEET 1
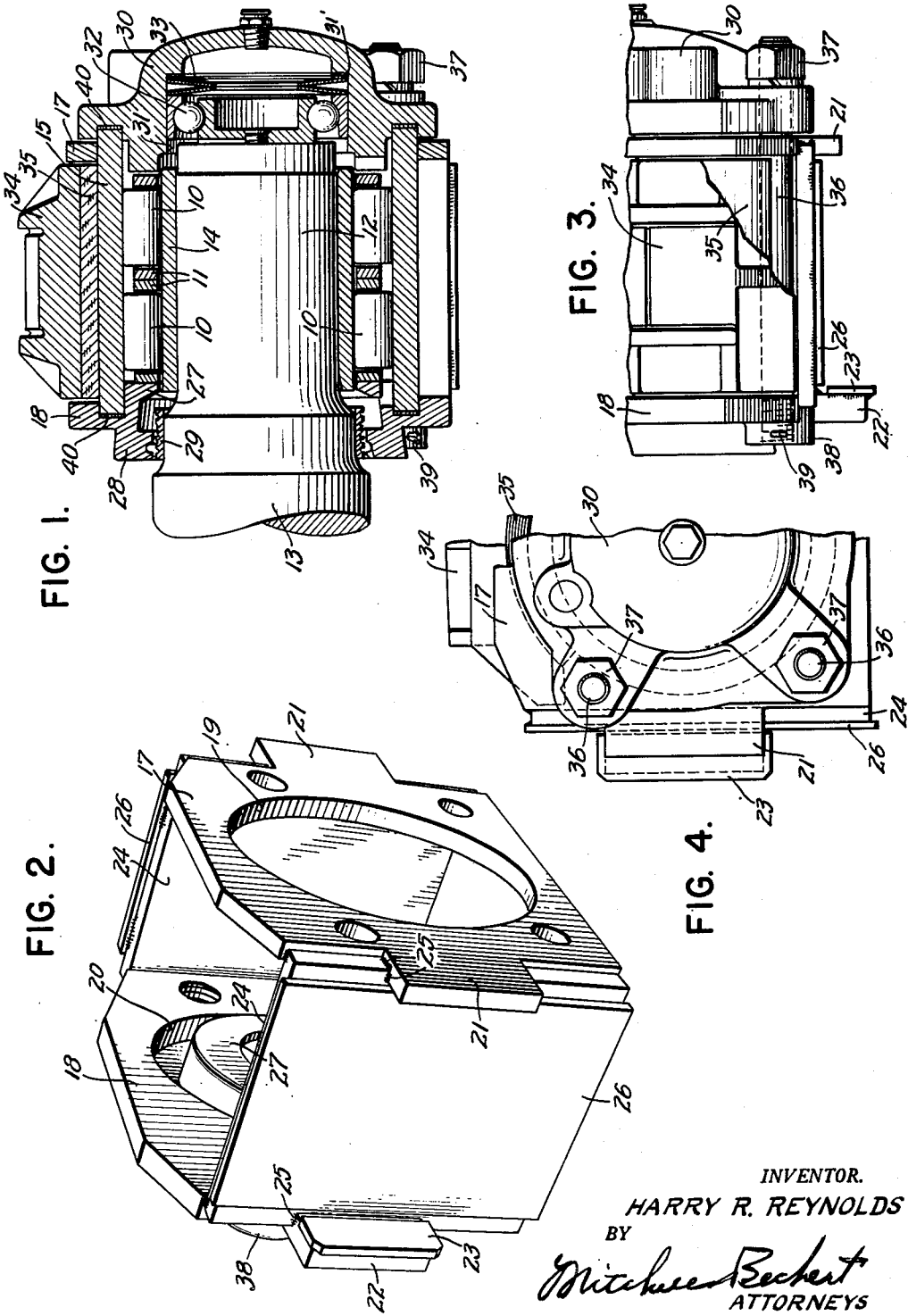
INVENTOR.
HARRY R. REYNOLDS
BY
*Mitchell Bechert*
ATTORNEYS March 17, 1953  H. R. REYNOLDS  2,631,902
JOURNAL BOX
Filed May 24, 1949  2 SHEETS—SHEET 2
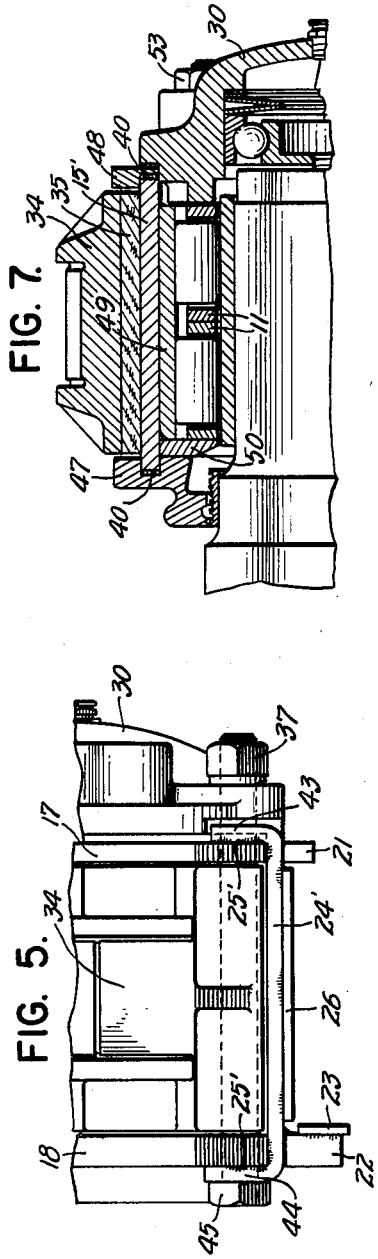
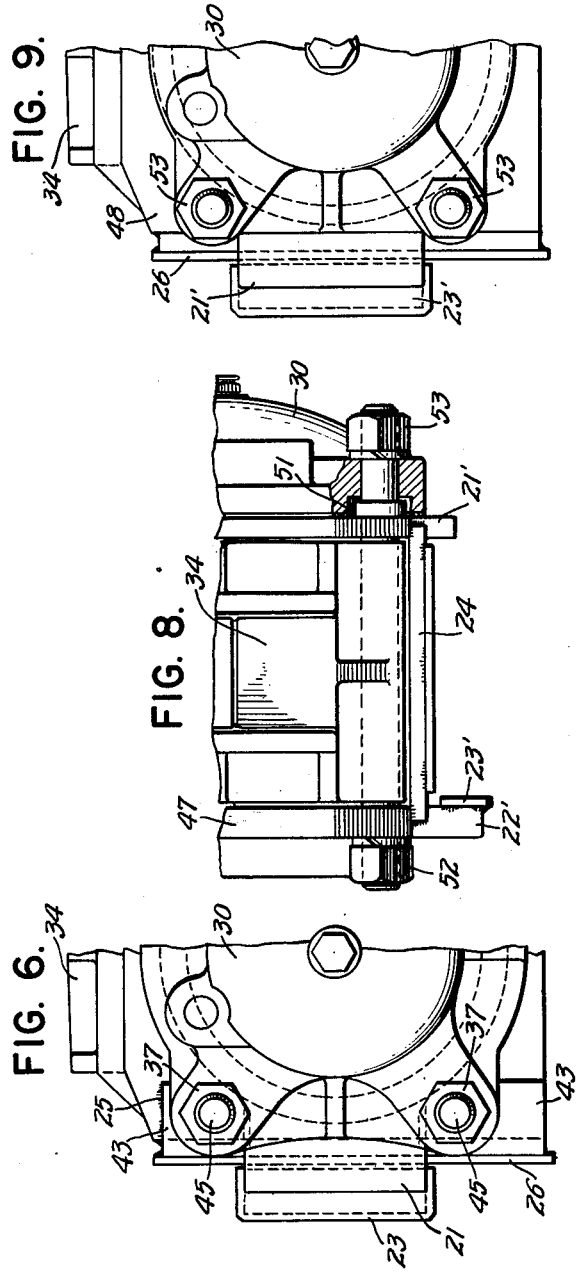
INVENTOR.
HARRY R. REYNOLDS
BY
Mitchell Bechert
ATTORNEYS Patented Mar. 17, 1953

2,631,902

UNITED STATES PATENT OFFICE 2,631,902

JOURNAL BOX

Harry R. Reynolds, New Britain, Conn., assignor to The Fafnir Bearing Company, New Britain, Conn., a corporation of Connecticut Application May 24, 1949, Serial No. 94,981

16 Claims. (Cl. 308—39)

1

My invention relates to an antifriction-bearing housing and to a bearing assembly including such a housing. In particular, such housing and assembly is of a type to be supported between pedestal shears or guides, as in the case of a passenger-car railway bearing. The present invention represents certain improvements over the inventions disclosed in the copending patent applications of Frank Noe, Serial No. 60,550, filed November 17, 1948, now Patent No. 2,560,183, and Serial No. 80,622, filed March 10, 1949, now Patent No. 2,573,159.

It is an object of my invention to provide an improved construction and assembly of the character indicated.

It is another object to provide an improved bearing housing of the character indicated in which antifriction bearing means may be more readily inserted or removed for replacement.

It is also an object to provide an improved railway-type anti-friction bearing journal-box assembly wherein greater loads may be sustained within standard dimensional limitations.

It is a further object to provide an improved bearing construction of the character indicated, wherein axial or end-thrust stresses may be more effectively sustained.

It is another object to provide an improved end-cover attachment means for a bearing construction of the character indicated.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 1 is a vertical sectional view of an antifriction railway journal bearing incorporating features of the invention and shown in application to the end of the railway axle;

Fig. 2 is a front three-quarter perspective view of a welded-box construction utilized in the assembly of Fig. 1;

Fig. 3 is a fragmentary plan view of the assembly of Fig. 1;

Fig. 4 is a fragmentary right-end view of the assembly of Fig. 1;

Fig. 5 is a fragmentary plan view similar to Fig. 3, but illustrating a modified construction according to the invention;

Fig. 6 is a right-end view of the construction of Fig. 5;

Fig. 7 is a fragmentary vertical sectional view of another modified construction according to the invention;

2

Fig. 8 is a fragmentary plan view of the construction of Fig. 7; and

Fig. 9 is a fragmentary right-end view of the assembly of Fig. 7.

Briefly stated, my invention contemplates an improved welded journal-box construction for accommodating antifriction bearing means. The basic box may include two end members with aligned bores to receive a cylindrical bearing member, and side members may be welded to the end members in order to space the end members and to produce an open-top box construction. In one of the forms to be described, the bore in one of the end members is open at one end, and the bore in the other end member is open only at one end; in another arrangement both bores are open only at one end of the respective members. In every case, the cylindrical bearing member is supported between the bores, and a cover member closes the open end of the assembly with securing means stressed in tension to hold the cover member from a base at the other side of the assembly. Thrust-sustaining means may be accommodated in the cover member to take end shocks from an axle, and the base for the cover-securing means may be the end member at the other (inner) end of the assembly. In the preferred forms shown, the inner end member carries oppositely directed integral side projections for direct thrust abutment with the sides of pedestal shears.

Referring to Figs. 1 to 4, my invention is shown in application to a railway bearing of the passenger-car type, wherein the bearing may float and be vertically guided between pedestal shears, and wherein the radial load may be sustained upon an equalizer or saddle. The bearing may include a plurality of rollers or antifriction elements, such as rollers 10, angularly spaced and retained as by retainer means 11. The antifriction elements 10 may ride directly upon the journal end 12 of a railway axle 13, or a separate cylindrical sleeve 14 may be fitted upon the said bore end 12. The sleeve 14 may have a suitably finished outer surface to serve as the inner raceway for the antifriction elements 10. The outer raceway may be provided by a second sleeve 15. The sleeve 15 may be of tubular stock and may form part of the housing for the assembly.

The bearing housing which is built around the sleeve member 15 may include spaced end plates or members 17—18. The member 17 may be termed the outer-end member, and the member 18 may be called the inner end member. The end members 17—18 may each have a bore to receive the sleeve member 15, and in the form shown the bore 19 for the end member or plate 17 is open at both sides of the said end plate 17, while the bore 20 for the end member 18 is open only to one side (the side facing member 17) of the end member 18. Both the end members 17—18 may be formed with lateral projections, such as 21 for the plate 17 (and 22 for the member 18), to be guided by the shears. If desired, wear plates 23 may be welded on the projections 22 of the inner end member 18. The housing assembly may be completed by side-wall members 24 having projections to lockingly engage the projections 21—22 and welded, as at 25, to the end members or plates 17—18. Again, wear plates, such as the plate 26, may be welded to the side-plate members 24. For axial locating purposes, the end member 18 may include an inwardly projecting flange portion 27 to be engaged by the retainer means 11, and the same end plate 17 may also include a flange portion 28 with an inner annular groove to cooperate with a dirt-and-water seal ring 29 carried by the axle 17.

At the outer end, a removable cover member 30 may fit over the end of the sleeve 15 and over certain parts of the end member or plate 17. The cover member 30 may be bored, as at 31, in order slidingly to support thrust-bearing means which is shown in the form of an antifriction bearing 32. The inner ring of the thrust bearing may ride against the end of the axle 13, and the outer ring of the thrust bearing 32 may be resiliently positioned by spring means 33 fitted in the bottom of the bore 31; the shoulder 31' at the bottom of the bore 31 may thus be viewed as thrust-sustaining means carried by the cover 30.

In accordance with a feature of the invention, a cylindrical bearing member is directly slidably insertably received in the bores 19—20 when assembling an antifriction bearing in the journal-box housing, and the supporting means for sustaining the vertical radial load on the bearing need not in any way directly radially sustain the journal-box housing itself; in other words, the cylindrical bearing member may be directly radially (vertically) supported by a saddle, without transfer of any substantial radial-load stresses via the journal-box housing. The journal-box housing may thus only serve to retain the parts in their assembled relationship and to sustain horizontally radial thrusts and axial thrusts, as will later be clear. It will be appreciated that the bearing-housing assembly as shown in Fig. 2 is essentially a box with an open top. This open top may receive and locate an equalizer member or saddle 34, and a pad of insulating material 35 may be sandwiched between the sleeve 15 and the equalizer 34.

In order that the bearing housing may effectively sustain end thrusts and apply them directly through the wear plates 23 to the sides of the pedestal shears, I employ longitudinally extending securing means to connect the inner end member 18 directly to the outer cover member 30. Such securing means is preferably stressed in tension so as to relieve any stressing of the welded parts of the journal box upon application of axial thrusts. In the form shown in Figs 1 to 4, the thrust-distributing securing means comprises tie bolts or rods 36, which may be secured to and fixedly carried by the inner end member 18 and which may project outwardly through openings in the outer end member or plate 17 and through openings in the cover member 30, for access for securing purposes, as by tightening nuts 37 on the threaded ends of the rods 36. The rods 36 may be threaded at both ends, and the fixed ends may be permanently held in threaded bosses 38, welded to or formed as a part of the inner end member 18. If desired, a cotter pin 39 or the like may be passed through diametrically extending holes in the boss 38 and in the tie rod 36 in order to retain the rod 36 against unthreading from the inner end member 18. The axial length of the bearing sleeve member 15 is preferably such that gasket means 40 may be interposed between the inner end member 18 and the sleeve 15, and between the end cover member 30 and the sleeve 15; in the form shown, the cover member 30 is formed with an annular groove facing the groove 20 in the inner end member 18, and the gaskets 40 are fitted in the bottoms of these grooves. The relationship of parts is preferably such that, upon a binding take-up of the nuts 37 against the cover member 30, the gasket 40 will be tightly compressed. There need be no residual compressional stressing of the end members 17—18 against the side-plate members 24.

In use, it will be appreciated that essentially the entire vertical radial load sustained by the bearing is transmitted directly to the equalizer 34 via the bearing sleeve 15; thus, the radial load may be sustained independently of any of the structure of the bearing housing. On the other hand, the thrust loads will be sustained by the thrust bearing 32, and thrust forces will tend to displace the cover member 30 in an outward direction. By virtue of the preferred tensile stressing of the tie rods 36, such tendencies for outward displacement of the cover member 30 are positively resisted by the tie rods, and thrust forces may be directly transmitted to the inner end member 18 which, through the projecting flanges 22 and wear plates 23, may apply thrust forces to the pedestal shears. It will be noted that in sustaining vertical radial loads and in sustaining end thrusts my improved construction obviates any stressing of the welds of the box assembly and, for that matter, any stressing of any part of the bearing-housing or box assembly. The bearing housing or box may thus serve essentially only as a retainer for the parts and as substantially unstressed supporting means for the plates 26 on the side members 24.

In Figs. 5 and 6 of the drawings, I show a modified form of the invention in which the parts are essentially the same as those described in connection with Figs. 1 to 4. In Figs. 5 and 6, however, I have formed the side plates 24' with end projections 43—44 to interlock with the side flanges or projections 21—22 and preferably to be bent over the outer or exposed faces of the end members 17—18. The bent-over projections 43—44 may be welded, as at 25, to the end members 17—18, and the tie bolts or rods may extend through the bent-over projections 43—44. In Figs. 5 and 6 a conventional bolt having a fixed head 45 is passed through the rear bent-over projection 44, through the bent-over projection 43; and, finally, through the cover member 30. Again, nuts 37 accessible from the outer end of the assembly may serve to clamp the cover 30 in place, and upon loosening the nuts 37, the member 30 may be removed in order to permit slidable end-wise removal of the sleeve 15 and of the bearing means contained within sleeve 15.

In Figs. 7, 8, and 9, I show still another modification of the invention. In this modification, a sleeve member 15' is permanently supported between end members 47—48, and the bores or counterbores which receive the cylindrical bearing member or sleeve 15' are effectively open at one side only of each of the members 47—48. The end members 47—48 may, like the previously described end members 17—18, include projecting side flanges 21'—22' for interlocking engagement with projections on side-plate members 24. Again, gaskets 40 may be seated in the bottoms of the grooves accommodating the sleeve 15'. If desired, the gaskets 40 may be compressed when welding the side plates 24 to the end members 47—48 in fabricating the journal box. In the form of Figs. 7, 8, and 9, a complete antifriction-bearing assembly is insertable within the sleeve 15'. This assembly may include an outer ring 49 riding within the sleeve 15' and a positioning ring 50 for the retainer 11 and for the outer bearing ring 59. Tie rod means may again be utilized to sustain the axial thrusts and to transmit them directly to the wear plates 23', without unduly stressing any part of the journal-box housing. The tie rods may be formed with a flange or abutment 51 to abut the outer face of the outer end member 48, and a take-up nut 52 may be permanently set against the back of the inner end member 47. In this arrangement, the tie rods may be permanently stressed in tension, regardless of whether the nuts 53 are secured in order to hold the cover member 30' in place.

It will be appreciated that I have provided an improved journal-box construction. In my construction, none of the precision-finish bearing parts have to be welded to the journal box, and yet the bearing may be readily removed. Furthermore, the journal box may serve essentially as a parts retainer, while the vertical radial load is taken directly on the bearing and the axial thrust load is taken through the tie means. Due to the fact that the equalizer or saddle may be directly loaded on the outer bearing ring, my construction makes possible the use of larger-diameter outer bearing rings, with consequent higher-capacity bearing elements, within given or standard dimensional limitations.

While I have described my invention in detail for the preferred forms shown, it will be understood that modifications may be made within the scope of the invention as defined in the appended claims.

I claim:

1. In a journal-box housing assembly, two spaced vertical side members and two spaced vertical end members secured to each other to form a box, said box being vertically open above the space between said side members, said end members having therein axially aligned bores, whereby with bearing means including an outer cylindrical surface supported in both said bores a saddle may be received in the open top of said box and may be in direct radial-load-sustaining relation with said cylindrical surface.

2. An assembly according to claim 1, in which a longitudinally extending tie rod is secured to one of said end members and extends longitudinally through an opening in the other said end member, said rod projecting beyond said other end member and including securing means for engagement by means for securing a cover member over said other end member.

3. In a journal-box housing of the character indicated, two end plates with oppositely extending radial projections, two side plates with projections interlocking said first-mentioned projections, said side and end plates being secured with said projections in interlocked relation, and said end plates having aligned bores to receive and to support a cylindrical bearing member spanning said bores.

4. As an article of manufacture, a journal-box subassembly, comprising two end members with aligned bores to receive and to support a cylindrical bearing member, two side members welded to said end members, there being parts of said end members in direct axial abutting relation with parts of said side members, longitudinally extending tie rods passing through longitudinally aligned openings in said end members, said tie rods being secured to the inner end member and projecting through and beyond the outer end member, said rods including securing means at the outwardly projecting ends thereof, whereby upon placement of a cover member over the outer end of said housing, said securing means may be engaged to hold the cover against the housing with said inner member as the base for the securing forces.

5. An article according to claim 4, in which said tie rods include abutment means external of said outer end member for compressional abutment with said outer end member, said tie rods projecting outwardly of said abutment means, whereby a cover member may be placed over the projecting ends of said tie rods and may be secured to said tie rods without need for access to the inner ends of said tie rods.

6. In a bearing-housing assembly of the character indicated, a housing including two end members with aligned oppositely facing bores open to the inner sides of said end members, rigid spacer means between said end members for holding said end members a given distance apart, an annular ring supported in said bores, said spacer means being on opposite lateral sides of said ring, and the space above said ring being open, so that a saddle may be received in said space and may be in direct radial-load-sustaining relation with said ring, and tie rod means secured to and extending between said end members for holding said end members together and against said spacer means.

7. In a bearing assembly of the character indicated, a housing including two end members with aligned cylindrical bores therein, the bore in one of said end members being open at both sides of said end members, two side members welded to said end members, a cylindrical bearing sleeve seated in both said bores, a cover member overstanding one end of said cylindrical sleeve and parts of said one end member, and longitudinally extending securing means secured to and extending between said other end member and said cover member.

8. A bearing assembly according to claim 7, in which said cover member has a bore to receive the outer diameter of said sleeve and in which said sleeve projects axially beyond the outer surface of said one end member for reception in the bore of said cover member.

9. A bearing assembly according to claim 8, in which the bore in said other end member is open only at one side, and in which gasket means are interposed between said sleeve and said other end member and between said sleeve and said cover member.

10. In a bearing housing assembly of the character indicated, two end members with oppositely extending side projections, two side members with projections interlocking the projections of said end members, the projections of said members being bent around the outer faces of said end members, said side and said end members being welded together, and said end members having aligned cylindrical bores to receive bearing means.

11. A bearing housing according to claim 10, in which said bent-over projections have longitudinally extending bores aligned with bores in said end members to receive longitudinally extending securing means to be stressed in tension between said end members.

12. In a bearing-housing assembly of the character indicated, a housing including two end members with aligned bores to receive a cylindrical bearing member spanning said end members, two side members secured to and spacing said end members, whereby said members may define a box in which a radial-load saddle may be received for directly sustaining a radial load on the cylindrical bearing member, one of said end members including lateral projections for axially directed abutment with pedestal shears, a cover member for the other of said end members and including thrust-sustaining means to take axially directed thrusts from an axle supported in said housing, and tie means spanning said one end member and said cover member, whereby axle thrusts may be in large part sustained by a tensional stressing of said tie means without substantially stressing the assembly of said box.

13. An assembly according to claim 12, in which said tie means includes rods holding said one end member and said cover member compressionally against the assembly of said box.

14. An assembly according to claim 13, in which said rods are threaded into said one end member.

15. An assembly according to claim 12, in which said tie means includes a bolt with a head engaging said one end member, and in which a nut is threaded on said bolt and driven against said cover member.

16. In a journal-box construction of the character indicated, an open-topped housing including two end members with axially aligned bearing seats, longitudinal spacer means between horizontally opposed sides of said end members, a cylindrical bearing member between said end members and seated therein, whereby a saddle may be inserted within the open top and in direct radial-load-sustaining relation with the cylindrical bearing member, and tie-rod means secured to and holding said end members together, whereby an axial thrust received by one of said members may be directly translated to the other of said members via said tie-rod means.

HARRY R. REYNOLDS.

REFERENCES CITED

The following references are of record in the file of this patent:

UNITED STATES PATENTS

| Number | Name | Date |
| --- | --- | --- |
| 1,774,655 | Messinger | Sept. 2, 1930 |
| 2,273,510 | Brauer | Feb. 17, 1942 |
| 2,448,655 | Bowen | Sept. 7, 1948 |